United States Patent
Desai

(10) Patent No.: US 6,523,078 B1
(45) Date of Patent: Feb. 18, 2003

(54) DISTRIBUTED LOCKING SYSTEM AND METHOD FOR A CLUSTERED SYSTEM HAVING A DISTRIBUTED SYSTEM FOR STORING CLUSTER CONFIGURATION INFORMATION

(75) Inventor: Mounish S. Desai, Columbia, SC (US)

(73) Assignee: Steeleye Technology, Inc., Mountain View, CA (US)

( * ) Notice: Subject to any disclaimer, the term of this patent is extended or adjusted under 35 U.S.C. 154(b) by 0 days.

(21) Appl. No.: 09/448,388

(22) Filed: Nov. 23, 1999

(51) Int. Cl.[7] .............................................. G06F 12/00
(52) U.S. Cl. ...................................................... 710/200
(58) Field of Search .............................. 710/200; 714/2, 714/4; 709/218, 210, 101; 707/8; 711/100, 147

(56) References Cited

U.S. PATENT DOCUMENTS

| | | | |
|---|---|---|---|
| 5,117,352 A | | 5/1992 | Falek |
| 5,222,217 A | | 6/1993 | Blount et al. |
| 5,414,839 A | * | 5/1995 | Joshi ........................... 710/200 |
| 5,596,754 A | | 1/1997 | Lomet |
| 5,612,865 A | | 3/1997 | Dasgupta |
| 5,613,139 A | * | 3/1997 | Brady .......................... 710/200 |
| 5,673,384 A | | 9/1997 | Hepner et al. |
| 5,699,500 A | | 12/1997 | Dasgupta |
| 5,727,206 A | | 3/1998 | Fish et al. |
| 5,828,876 A | | 10/1998 | Fish et al. |
| 5,832,222 A | | 11/1998 | Dziadosz et al. |
| 5,862,312 A | | 1/1999 | Mann et al. |
| 5,920,872 A | * | 7/1999 | Grewell et al. .............. 707/202 |
| 5,924,122 A | * | 7/1999 | Cardoza et al. .............. 711/150 |
| 5,987,477 A | * | 11/1999 | Schmuck et al. ............ 709/203 |
| 6,108,654 A | * | 8/2000 | Chan et al. .................. 710/200 |
| 6,151,659 A | * | 11/2000 | Solomon et al. ............ 710/200 |
| 6,389,420 B1 | * | 5/2002 | Vahalia et al. .............. 709/248 |

* cited by examiner

Primary Examiner—Xuan M. Thai
(74) Attorney, Agent, or Firm—Nelson Mullins Riley & Scarborough

(57) ABSTRACT

A distributed locking system and method for a clustered system having a distributed system for storing cluster configuration information is provided. One aspect of the present invention allows a process or thread in a high availability solution to obtain a distributed lock on all relevant nodes in a clustered system. Another aspect of the present invention allows more than one thread to obtain a lock and perform a critical operation on different nodes concurrently.

15 Claims, 4 Drawing Sheets

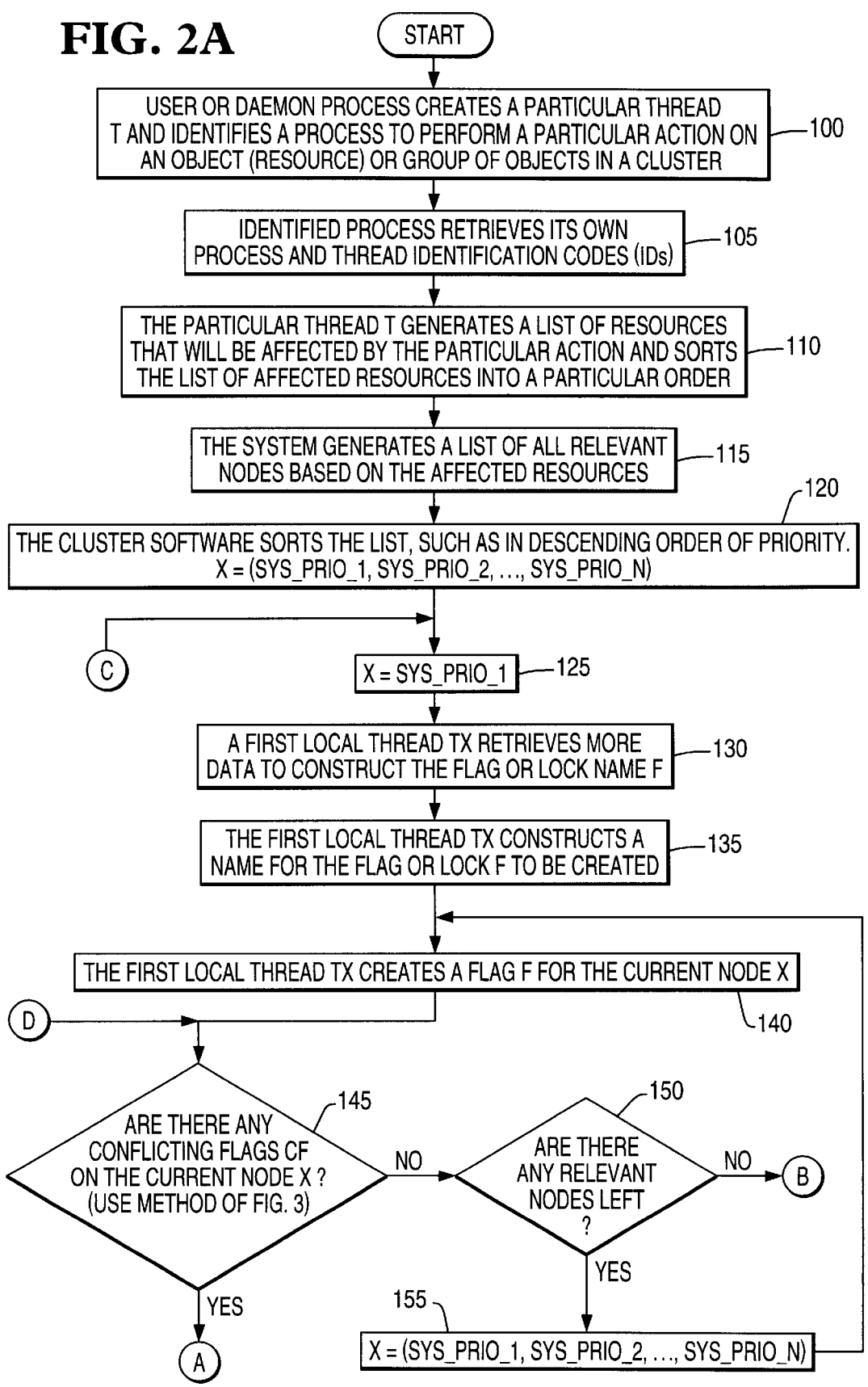

DISTRIBUTED LOCKING SYSTEM AND METHOD FOR A CLUSTERED SYSTEM HAVING A DISTRIBUTED SYSTEM FOR STORING CLUSTER CONFIGURATION INFORMATION

The present invention relates to a locking system and method for use in a multi-node distributed clustering product.

BACKGROUND OF THE INVENTION

Multi-processing systems are commonly configured in a cluster of related nodes to ensure high availability. A clustered system is a collection of processing elements that is capable of executing a parallel, cooperating application. Each processing element in a cluster is an independent functional unit, such as a symmetric multiprocessor server, which is coupled with the other cluster elements through one or more networks. One type of cluster system is described in U.S. Pat. No. 5,117,352 entitled "MECHANISM FOR FAIL-OVER NOTIFICATION" issued to Louis Falek on May 26, 1992 and assigned to Digital Equipment Corporation.

In a clustered environment, there is often a need for one node to provide backup upon failure of another node. For example, in a three-node cluster, an application may be in service on node A, with node B configured as the highest priority backup node. If node A crashes, then node B begins to bring the application in service automatically. If a system administrator simultaneously attempts to bring the application in service on node C, then there is the possibility of the application being brought into service on nodes B and C simultaneously.

To prevent this possibility of the application being brought into service simultaneously on two nodes, many multi-processing systems possess either a quorum device or some other mechanism to create a single, global cluster configuration database. For these systems, it is sufficient for each node to obtain a single lock on the central cluster configuration database itself. All updates to the cluster configuration are serialized, so all nodes in the cluster have the same view of the cluster configuration insuring that only one node will attempt to bring an application into service.

Other types of clustered systems, such as systems running LifeKeeper (trademark of NCR Corp., Dayton, Ohio), possess a distributed system for storing cluster configuration information. Accordingly, each node keeps its own view of the cluster configuration (e.g. which nodes are currently servicing an application, which nodes or communication paths are alive, etc.). Clustered systems possessing such a distributed system for storing cluster configuration information may use a distributed locking system to prevent two or more nodes from making changes to the cluster configuration simultaneously. U.S. Pat. No. 5,828,876, Fish et al., issued on Oct. 27, 1998, assigned to NCR Corporation and entitled "File System For A Clustered Processing System" describes a distributed system and is hereby incorporated by reference.

However, current distributed locking systems may allow a starvation problem typical in distributed software and prevent a thread from acquiring a cluster wide lock indefinitely. Chances of a starvation problem occurring increases with the number of nodes in the cluster. Additionally, current distributed locking systems may fail to handle a time value in a unit smaller than a millisecond and may fail to take into account many configuration features of the clustered system.

Accordingly, there is a need for an improved distributed locking system and method which avoids the problems discussed above.

SUMMARY OF THE INVENTION

In accordance with the teachings of the present invention, an improved distributed locking system and method for a clustered system having a distributed system for storing cluster configuration information is provided. One aspect of the present invention allows a process or thread in a high availability solution to obtain a distributed lock on all relevant nodes in a clustered system. Another aspect of the present invention allows more than one thread to obtain a lock and perform a critical operation on different nodes concurrently.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a block diagram of a cluster which the system and method of the present invention may be used in.

DETAILED DESCRIPTION OF THE INVENTION

Figure 1:
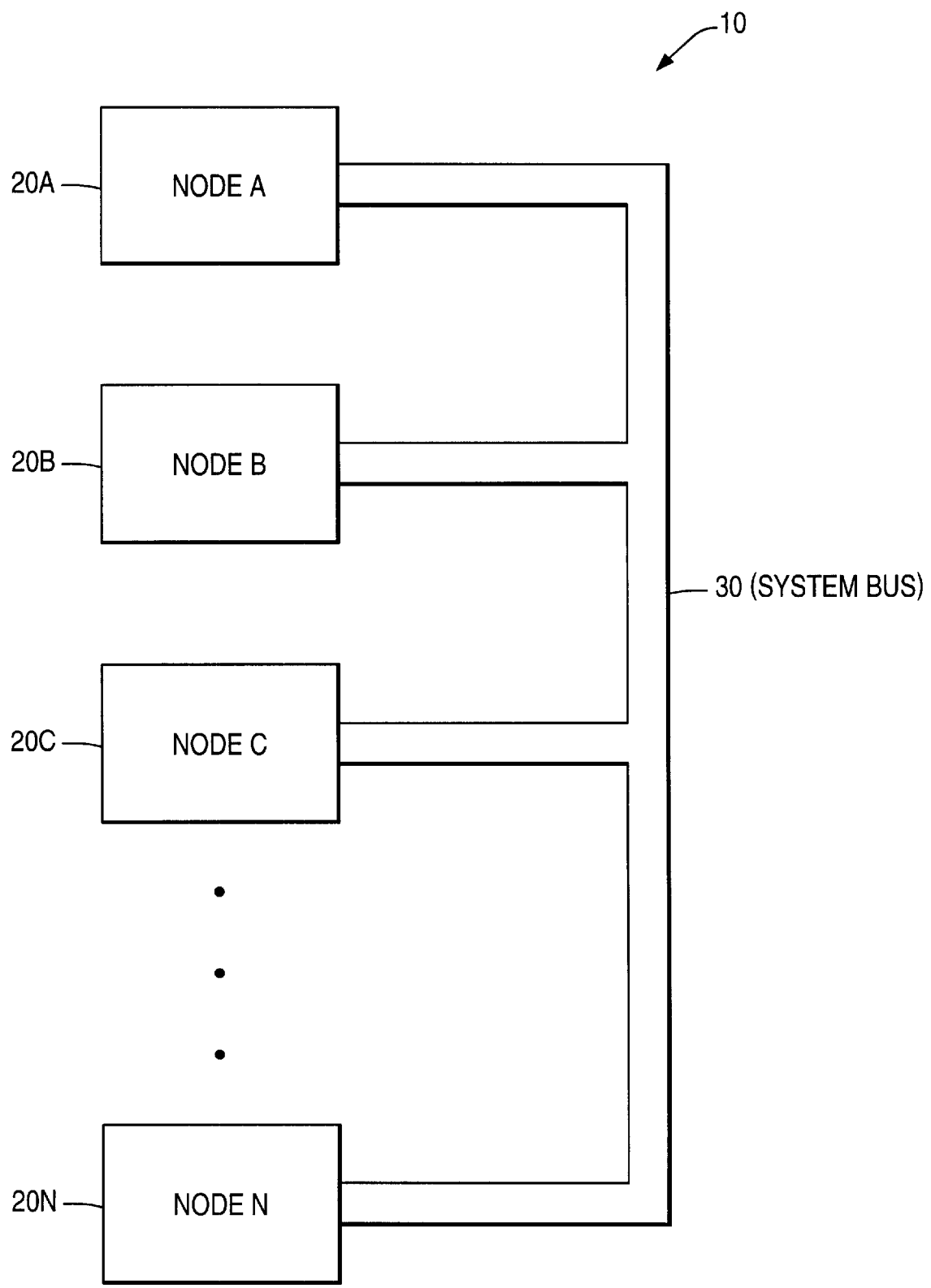

Referring now to the drawings, in which like-referenced characters indicate corresponding elements throughout the several views, attention is first drawn to FIG. 1 which shows a block diagram of a clustered system 10 including a plurality of nodes 20A, 20B, . . . 20N, and a system bus 30. Each system 20A, 20B, . . . 20N includes at least one processor and may include a plurality of processors as well as other components typically found in clustered systems. The network 30 may be any standard bus used to connect systems 20A, 20B, . . . 20N in a clustered system 10. Clustered system 10 includes a distributed method for storing cluster configuration information incorporated in the cluster software.

Figure 2B:
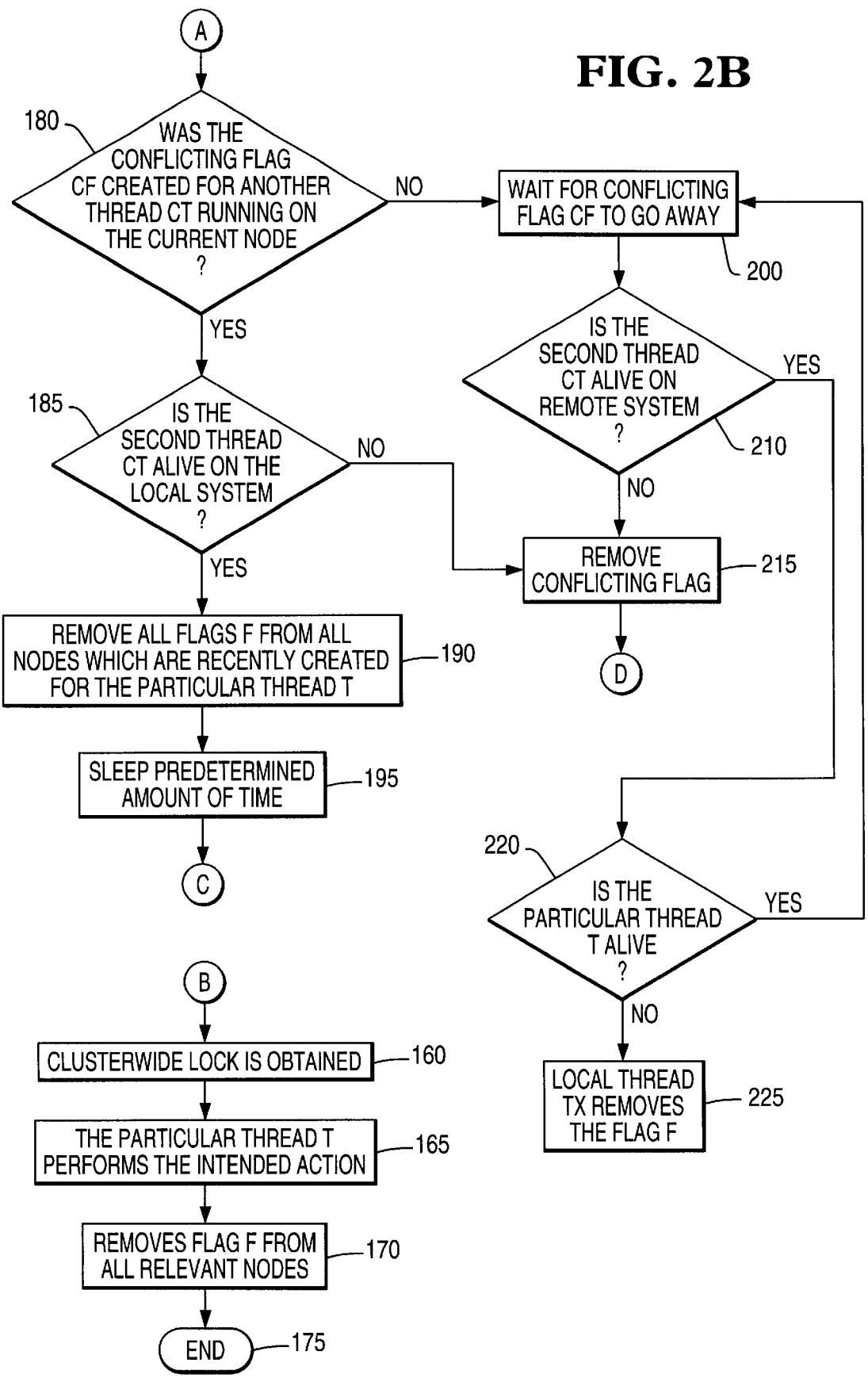
FIG. 2 is a flowchart for obtaining distributed lock according to the method of the present invention.

FIG. 2 is a flowchart showing a method for a particular thread to obtain a distributed lock before performing a particular operation in the cluster, by constructing a lock name or flag that is unique in space and time according to the present invention. (Throughout the discussion, letters are used to assist in distinguishing different threads and associated flags.) First, in step 100, a user or a daemon process of the cluster software creates a particular thread T and identifies a process to perform a particular action on an object (resource) or group of objects in a cluster. This object or group of objects may be located on one or a plurality of nodes, and may represent an application or computer system resources. (The created particular thread T is also referred to as the first remote thread T in discussions below.)

In step 105, the identified process retrieves its own process and thread identification codes (IDs). The cluster software uses these IDs to generate a string for the flag or lock F to be created later. The identified process may also retrieve other information such as a system name, priority of the system for the object or group of objects, and an action code.

In step 110, the particular thread T generates a list of resources that will be affected by the particular action identified in step 100. Also in step 110, the particular thread T sorts the list of affected resources into a particular order. One such order could be alphabetic. The first ID of the object in this sorted list may be used as a component in the name of the flag or lock F to be created later.

In step 115, the system generates a list of all relevant nodes, based on the affected resources. (A relevant node is a node on which an affected resource is defined.) In step 120, the cluster software sorts the list, such as in descending order of priority. In step 125, the cluster software initializes an index for indicating a current node from the list of relevant nodes, such as to the highest priority node.

Next in step 130, a first local thread TX retrieves more data to construct the flag or lock name F. (A local thread indicates a thread that is running on the system associated with the node currently indicated by the index in step 125). Specifically, in step 130, the first local thread TX may retrieve the current system time and the counter value from the daemon process of the cluster software running on the current node. Next, in step 135, the first local thread TX constructs a name for the flag or lock F to be created, using data the first local thread TX collected in step 130.

Next, in step 140, the first local thread TX creates a flag F for the current node. The particular features of the flag F are described below. Next, in step 145, the first local thread TX checks if there are any conflicting flags CF on the current node using the method shown in FIG. 3. If there are no conflicting flags CF, then in step 150, the particular thread T checks if there are any other relevant nodes from step 115 left to create a flag or lock F on.

If there are other nodes to check, the indicator is indexed in step 155 (using the list generated in step 120) and the cluster software returns to step 120 to create a flag or lock F for the particular thread T on the next node. The indicator indexing provides a means for the particular thread T to obtain locks on all relevant nodes in a particular priority order. The user can configure the priority of the nodes. If the cluster software has created a flag F for the particular thread T on all the relevant nodes, then in step 160, a clusterwide lock is obtained according to the present invention and the particular thread T can perform the particular action without the concerns listed above. In step 165, the particular thread T performs the intended action, and then the cluster software removes flags F from all the relevant nodes in step 170.

If there is a conflicting flag CF found in step 145 (using the method in the flowchart of FIG. 3), the system checks, in step 180, whether the conflicting flag CF was created for another (potentially conflicting) thread CT (basically equivalent to T) running on the current node. If the conflicting flag CF was created by a second thread CT running on a remote node not associated with a particular thread T, then the cluster software, in step 200, waits for the conflicting flag CF to expire. The system checks for liveliness of the second thread CT in step 210. If the second thread CT is not alive, the first local thread TX removes the conflicting flag in step 215 and the cluster software returns to step 145 and proceeds to check for additional conflicting flags on the local node. If the second thread CT is alive, in step 210, the first local thread TX checks whether the particular thread T is alive in step 220. If the particular thread T is alive, then the cluster software returns to step 200 to wait for the conflicting flag CF to go away. If T is not alive, then in step 225, the flag F is removed by the first local thread TX.

Returning to the other branch from step 180, if the second thread CT running on the local node created the conflicting flag CF, then in step 185 the cluster software checks whether the second thread CT is alive on the local system. If the second thread CT is not alive on the local system, then in step 215, the cluster software removes the conflicting flag and returns to step 145, proceeding to check for conflicting flags on other local nodes.

If the second thread CT is alive on the local system, then in step 190, the particular thread T removes all flags F from all nodes which it has already created. This step 190 prevents a starvation problem from occurring. If the particular thread T does not provide for all the flags to be removed, then a flag F could prevent other threads (such as CT) from getting the lock while the particular thread T itself is not in a position to obtain the needed lock, causing a starvation problem as described above.

Next, in step 195, the cluster software waits a predetermined amount of time (timeout period) before returning to step 125 to attempt to gain the needed locks on the identified nodes to allow the particular thread T to run. This predetermined amount of time may be determined using the sleeping node's priority value as the number of seconds to wait. If the thread T belongs to the system whose priority for the protected resource is two, the thread T will wait two seconds before resuming the process of getting a clusterwide lock. Thus, a thread T with a higher priority (e.g. a lower priority numerical value) has an edge over a lower priority thread. After this predetermined timeout period, the thread associated with the conflicting flag CF should have been run, and the conflicting flag CF removed. Now, the particular thread T can begin again to obtain a cluster wide lock and successfully perform its associated action.

Figure 3:
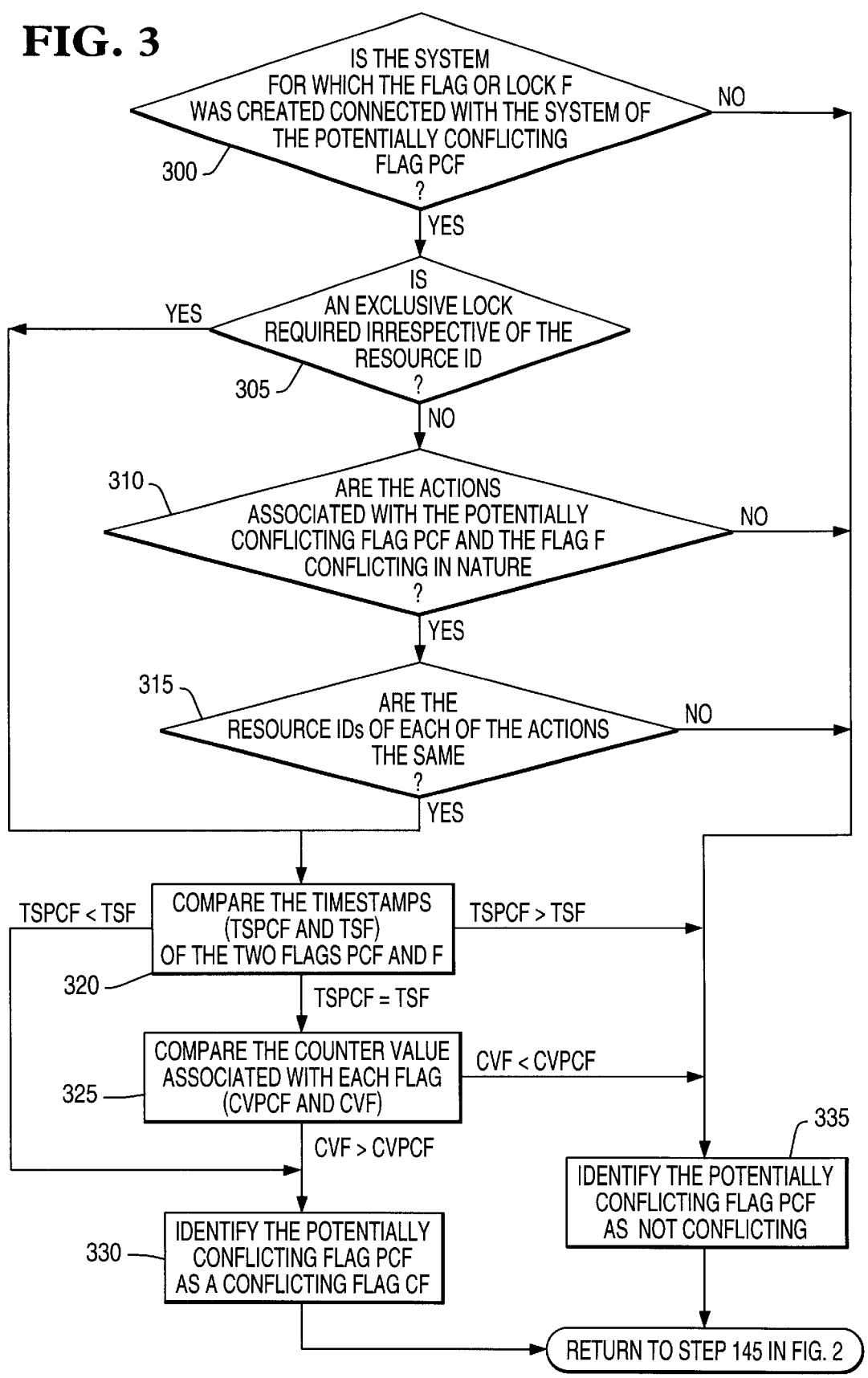
FIG. 3 is a flowchart for determining whether a conflicting flag exists.

Referring to FIG. 3, a flowchart for determining whether a conflicting flag CF exists (step 145 in FIG. 2) is shown. In step 300, the system (see step 105 of FIG. 2 retrieving system name for the identified thread T), for which the flag or lock F was created, is checked as to whether it is connected with the system of the potentially conflicting flag PCF. If the two systems are not connected, then, in step 335, the potentially conflicting flag PCF is deemed to be not conflicting and the system returns to step 145 in FIG. 2.

If the thread TX determines that the two systems are connected, then, in step 305, the thread TX checks the particular thread T as to whether an exclusive lock irrespective of the resource ID is required. If an exclusive lock is required, then the thread TX proceeds to step 320, discussed below. If an exclusive lock is not required, then the thread TX proceeds to step 310 to determine whether the actions associated with the potentially conflicting flag PCF and the flag F are conflicting in nature. This determination may be performed by comparing the action codes of the two flags while referring to the design of the clustering software and the configuration setup.

If the actions are not conflicting, then the thread TX proceeds to step 335. If the actions are conflicting, then a check on whether the resource ID of each of the actions are the same in step 315. If the resource ID of each of the actions are not the same, then the thread TX proceeds to step 335. If the resource ID of each of the actions are the same, then the thread TX proceeds to step 320 where the timestamps of the two flags PCF and F are compared.

The timestamps of the potentially conflicting flag PCF may be greater than, less than or equal to the timestamp of the flag F. If the timestamp of the potentially conflicting flag PCF is greater than the timestamp of the flag F, then the system proceeds to step 335. If the timestamp of the potentially conflicting flag PCF is less than the timestamp of the flag F, then the system proceeds to step 330.

If the timestamps of the two flags are equal, the system proceeds to step 325. In step 325, the thread TX compares a counter value associated with each flag (obtained from cluster server's daemon process). The counter value associated with each flag is unique because as a thread requests an associated value, the counter increments and the next requesting thread receives the incremented value. Thus, even if two flags have identical timestamps, the two flags cannot have identical counter values. If the potentially conflicting flag's PCF counter value is less than the particular flag's F counter value, the thread TX proceeds to step 330 where the potentially conflicting flag PCF is identified as a conflicting flag CF. The system then returns to step 145 in FIG. 2. If the potentially conflicting flag's PCF counter value is greater than the particular flag's F counter value, the thread TX proceeds to step 335 where the potentially conflicting flag PCF is identified as not conflicting. The system then returns to step 145 in FIG. 2. Throughout the above discussion, it is possible that the first local thread TX may die abnormally. To prevent any negative consequences from this occurrence, the cluster software or daemon process checks periodically for the liveliness of the first local thread TX and creates a new local thread NTX if the first local thread TX is not alive. This new local thread NTX continues to create the needed flag F and checks for conflicts after cleaning up any flag created by the first local thread TX.

It is important to note that the flag created in step 140 of FIG. 2 must have many attributes to provide the information needed for the method of the present invention to operate properly. A consistent naming convention must uniquely identify the particular thread T requesting the lock and also uniquely identify the clustered object or group of objects to be locked. If this clustered object or group of objects shares a dependent resource with another clustered object, the naming convention must uniquely identify the entire resource hierarchy. (For example, if both an "oracle" and "informix" database resource are dependent on the same "volume" resource, the method of the present invention must serialize all changes to any component of the shared hierarchy.)

In a preferred embodiment, this unique name includes the requesters' process ID (identification number) and thread ID, the name of the node on which the thread is running, the local system time stamp at the time of flag creation, the application name, and the name of the resource for which the thread is trying to get a lock. The local system time stamp is obtained from the system and the counter value is obtained from the daemon process. The counter value may be a combination of the date and a counter which is reset every day. (The counter is independent of any time base (such as milliseconds).) In constructing the lock name as described above, additional considerations must also be observed. If the resource being locked is part of a shared resource hierarchy, then the application name portion of the lock name is chosen as the first application name among the members of the resource hierarchy, when they are alphabetically ordered.

In one embodiment of the present invention, the index of nodes listed in step 155 of FIG. 2 can be limited to nodes on which the particular resource is protected. This minimizes the list of relevant nodes for which a flag must be created to obtain the desired cluster wide lock.

Another aspect of the present invention recognizes that often, in a cluster, an application is installed on more than one node, with each node being assigned a priority for the application. The cluster software can use this priority value to sort the nodes in descending order of priority and to have the particular thread T follow this order when creating a flag F on each relevant node. If one application shares a resource with other applications, then the particular thread attempting to obtain a lock to perform a particular action will have to create flags F and not have conflicting flags for all hierarchies having common dependencies.

The present invention forces all cluster members to obtain locks on the various nodes of the cluster in priority order, where a user may configure the priority of the nodes. This obtaining locks in a priority order may prevent a potential deadlock in which two separate threads may deadlock attempting to lock the same resource in different orders.

In the present invention, when the cluster software on a node detects a name collision (the cluster software on another node attempting to lock the same resource), the cluster software of the first node periodically checks to make sure the process that requested the lock is still running. If so, the node waits for the owning process to complete. If not, the node takes ownership of the lock. This prevents a potential deadlock in which one node may partially obtain a lock and fail (i.e. due to an application or system crash or an abort by the user.) without cleaning up, thus preventing any other node in the cluster from obtaining a lock on the resource.

Although the present invention has been described in terms of software, one skilled in the art would readily recognize that the embodiments may be performed in any combination of software and hardware and such embodiments are within the scope of the present invention as described and claimed.

Although the invention has been described with particular reference to certain preferred embodiments thereof, variations and modifications of the present invention can be effected within the spirit and scope of the following claims.

What is claimed is:

1. In a clustered system having a distributed system for storing cluster configuration information wherein the clustered system includes a plurality of nodes, a method for obtaining a cluster wide lock for a process using an associated thread prior to performing an action on a resource comprising the steps of:

(a) creating a flag on a node wherein the flag uniquely identifies the thread and the resource being locked;

(b) checking if any conflicting flags exist on the node;

(c) repeating steps (a) and (b) for all remaining nodes, if no conflicting flags are found in step (b); and (d) indicating that all nodes have been locked so the process may perform the action on the resource.

2. The method of claim 1 wherein the flag further includes the process identification code, a name of the node on which the thread is running, a local system time stamp at the time the flag is created, and the resource name.

3. The method of claim 2 wherein the step of checking if any conflicting flags exist on the node includes comparing the local system time stamp at the time the flag is created with the local system time stamp of any other flags.

4. The method of claim 2 wherein the step of checking if any conflicting flags exist on the node includes comparing a counter value associated with the flag with a counter value of any other flags.

5. A distributed locking method for a cluster having a distributed system for storing cluster configuration information wherein the cluster includes a plurality of nodes, comprising the steps of:

(a) identifying a thread that needs to perform an action on a resource;

(b) generating a list of all relevant nodes;

(c) creating a flag on a node identifying the thread, wherein the node is the highest priority node from the list of relevant nodes which has not had a flag created for the identified thread;

(d) checking if any conflicting flags exist on the node;

(e) repeating steps (c) and (d) for all remaining relevant nodes, as long as no conflicting flags are found;

(f) if any conflicting flag is found, checking if the found conflicting flag was created by a thread running on a local node and checking if the thread is alive on a remote system;

(g) if the found conflicting flag was created by the thread running on the local node, removing flags from all nodes where a flag was created for the thread without conflict.

6. The method of claim 5 further including the step of:

(h) if the found conflicting flag was created by the thread running on the local node, waiting a predetermined period of time before attempting to obtain a lock to allow the thread to perform the action on the resource.

7. The method of claim 5 further including the step of:

(i) if the found conflicting flag was created by the thread running on a local node and the thread is not alive on the remote system, removing the conflicting flag.

8. The method of claim 5 wherein the step of checking if any conflicting flags exist on the node further includes comparing the local system time stamp at the time the flag is created with the local system time stamp of any other flags.

9. The method of claim 5 wherein the step of checking if any conflicting flags exist on the node further includes comparing a counter value associated with the flag with a counter value of any other flags.

10. The method of claim 5 further including the step of sorting the list of relevant nodes in descending order of priority.

11. In a clustered system having a distributed system for storing cluster configuration information wherein the clustered system includes a plurality of nodes, a system for obtaining a cluster wide lock for a process using an associated thread prior to performing an action on a resource comprising:

means for creating a flag on each relevant node wherein the created flag uniquely identifies the thread and the resource being locked;

means for checking if any conflicting flags exist on each node; and means for indicating that all relevant nodes have been locked so the process may perform the action on the resource.

12. A distributed locking system for a cluster having a distributed system for storing cluster configuration information wherein the cluster includes a plurality of nodes, comprising:

means for identifying a thread that needs to perform an action on a resource;

means for generating a list of all relevant nodes;

means for creating a flag on each relevant node identifying the thread and means for checking if any conflicting flags exist on each node, wherein the order of nodes for creating flags and checking for conflicting flags is is the highest priority node to the lowest priority node from the list of relevant nodes;

if any conflicting flag is found, means for checking if the found conflicting flag was created by a thread running on a local node and checking if the thread is alive on a remote system; and if the found conflicting flag was created by the thread running on the local node, means for removing flags from all nodes where a flag was created for the thread without conflict.

13. The system of claim 12 further including:

if the found conflicting flag was created by the thread running on the local node, means for waiting a predetermined period of time before attempting to obtain a lock to allow the thread to perform the action on the resource.

14. The system of claim 12 further including:

if the found conflicting flag was created by the thread running on a local node and the thread is not alive on the remote system, means for removing the conflicting flag.

15. An article of manufacture comprising a computer program carrier readable by a computer and embodying one or more instructions executable by the computer to perform in a clustered system having a distributed system for storing cluster configuration information wherein the clustered system includes a plurality of nodes, a method for obtaining a cluster wide lock for a process using an associated thread prior to performing an action on a resource, the method comprising the steps of:

(a) creating a flag on a node wherein the flag uniquely identifies the thread and the resource being locked;

(b) checking if any conflicting flags exist on the node;

(c) repeating steps (a) and (b) for all remaining nodes, if no conflicting flags are found in step (b); and (d) indicating that all nodes have been locked so the process may perform the action on the resource.

* * * * *